2,891,856
MANUFACTURE OF FERTILIZER FROM WET-PROCESS PHOSPHORIC ACID AND AMMONIA

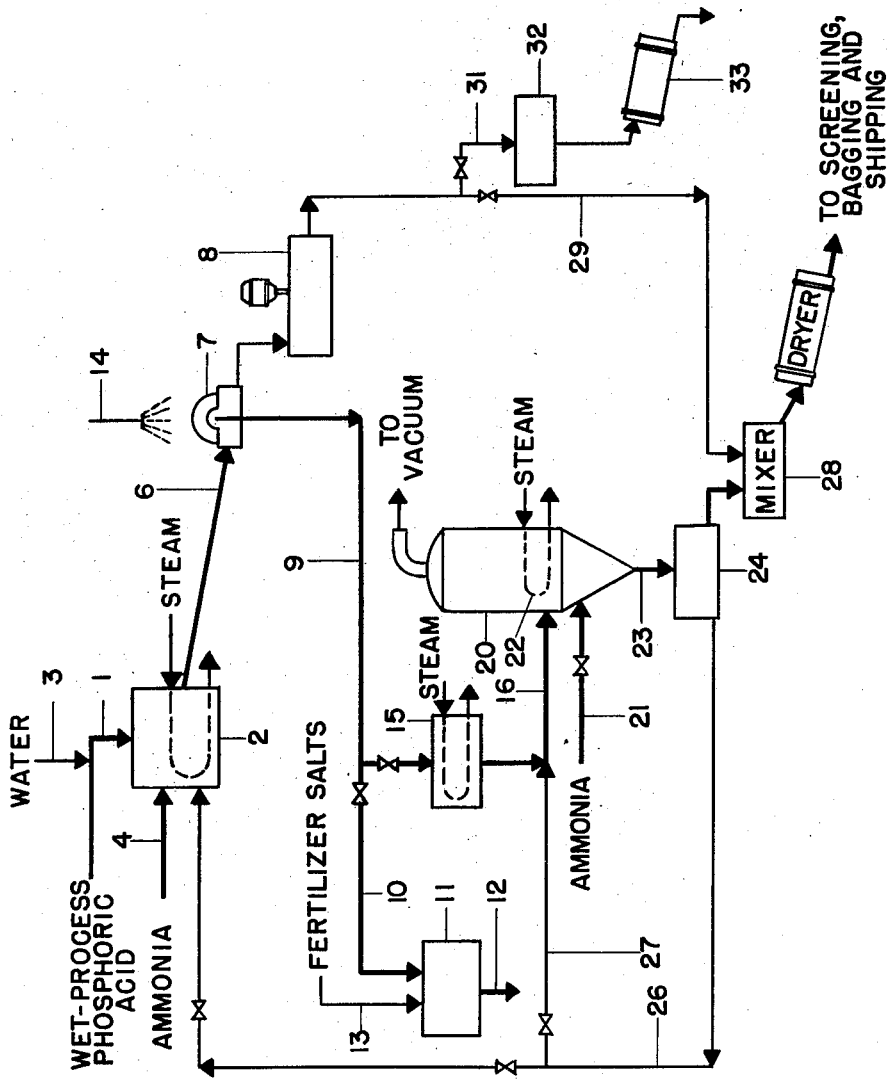

John G. Getsinger, Florence, Ala., and Robert L. Haunschild, Kansas City, Mo.; said Getsinger assignor to Tennessee Valley Authority Application December 12, 1955, Serial No. 552,672

9 Claims. (Cl. 71—41)

(Granted under Title 35, U.S. Code (1952), sec. 266)

The invention herein described may be manufactured and used by or for the Government for governmental purposes without payment to us of any royalty thereon.

This invention relates to improved processes for the production of fertilizers from wet-process phosphoric acid and ammonia. It is especially concerned with improvements in processes for the removal of impurities containing iron, aluminum, and calcium from acid of this type.

Wet-process phosphoric acid is very impure. Since it is ordinarily prepared by treating phosphate rock with dilute sulfuric acid, it may contain any acid-soluble impurities present in the rock, and these may vary widely in both composition and amount. For example, a wet-process phosphoric acid ordinarily may be expected to contain about 27 to 28 percent $P_2O_5$, 2.5 to 3.0 percent $SO_3$, 2 to 3 precent fluorine, 1.25 to 1.75 percent $Fe_2O_3$, 1.25 to 1.6 percent alumina, 0.25 to 0.4 percent calcium oxide, and about 50 to 55 percent water. These proportions are quite variable, however, and the quantities of impurities may vary rather widely from those set out above.

Monoammonium and diammonium phosphates are effective for fertilizer use because of their favorable physical properties and high concentration of plant foods, and because they provide economical methods for fixing ammonia in solid form. Diammonium phosphate is more attractive as a method for fixing ammonia, because it fixes twice as much ammonia per unit of $P_2O_5$. Greenhouse tests have shown that diammonium phosphate is an effective fertilizer and is comparable to monoammonium phosphate as a source of nitrogen and phosphorus pentoxide. A recent review of agronomic data shows that monoammonium phosphate and diammonium phosphate are particularly suited for use on alkaline soils and on acid soils when their residual acidity is neutralized with limestone.

Monoammonium phosphate fertilizer has been made commercially in both the United States and Canada from ammonia and wet-process phosphoric acid by a process described in Industrial and Engineering Chemistry 41, 1318 ff. (1949). That process is impractical, however, for the production of diammonium phosphate because of the high vapor pressure of ammonia over diammonium phosphate solutions, which results in excessive loss of ammonia at the temperatures utilized in that process.

Diammonium phosphate also has been produced by crystallizing from a mother liquor containing the fairly pure electric-furnace phosphoric acid. Wet-process phosphoric acid cannot be substituted for the purer electric-furnace acid in this process because of the large quantities of impurities contained in the wet-process acid. When an attempt is made to crystallize diammonium phosphate from wet-process acid, a precipitate forms containing iron, aluminum, and calcium; and this precipitate causes eventual gelling of the entire solution. Moreover, this precipitate is in such physical form that it is extremely difficult to separate it from the solution by filtration, centrifuging, decanting, or other practical means.

It is an object of this invention to provide an improved process for producing fertilizers from wet-process phosphoric acid and ammonia.

Another object is to provide an improved process for precipitating impurities containing iron, aluminum, and calcium from wet-process phosphoric acid in nongelatinous and easily separable form.

Another object is to provide a process for the manufacture of fertilizers from wet-process phosphoric acid in which both purified acid and precipitated impurities may be used.

Another object is to provide a method for precipitating impurities containing iron, aluminum, and calcium from wet-process phosphoric acid which results in an acidic solution that may be used for crystallization of diammonium phosphate.

Other objects and advantages will become apparent as this disclosure proceeds.

I have found that the foregoing objects may be attained in a process which comprises introducing ammonia at a rate of less than 15 pounds of ammonia per hour per cubic foot of reactor volume into wet-process phosphoric acid having a concentration in the range from 20 to 28 percent $P_2O_5$; heating the resulting liquor to boiling before the pH reaches a point where the rate of precipitation becomes rapid; and discontinuing introduction of ammonia when the pH of the liquor becomes 4.5 to 5.5, without strong agitation at any point in this process.

Five critical factors are involved in forming an easily separable precipitate containing substantially all the iron, alumina, and calcium contained in the wet-process acid. These critical factors are: (1) the concentration of the acid used; (2) the rate of introduction of ammonia; (3) the temperature at which rapid precipitation occurs; (4) the final pH of the acid solution; and (5) the absence of strong agitation.

Wet-process phosphoric acid often is produced at a concentration of 27 to 28 or more percent $P_2O_5$. The use of acid of higher concentration results in a precipitate that is extremely difficult to separate, but I have found that an easily separable precipitate can be produced from acid of lower concentration—20 to 28 percent, but preferably about 23 to 24 percent $P_2O_5$—provided the rate of introduction of ammonia is not more than 15 pounds of ammonia per hour per cubic foot of acid, provided further that rapid precipitation occurs at boiling temperature, and that the final pH of the resulting liquor is not too high and the solution is not strongly agitated. All these factors are critical, and failure to observe any one of them results in a precipitate that is very difficult to separate from the mother liquor.

I have found that this precipitate, even after separation from the solution, is easily liquefied by strong agitation. This property is advantageous in that it enables easy handling of this material in later steps in fertilizer manufacture.

I have found that diammonium phosphate may be readily crystallized from the separated solution without serious loss of ammonia by ammoniating the solution to about pH 6.0 while boiling under vacuum.

The attached drawing is a flow sheet diagrammatically illustrating a method for carrying out my invention. There it is shown that wet-process phosphoric acid is introduced via line 1 into an ammoniation vessel 2. If this acid is in the concentration range from 20 to 28 percent $P_2O_5$, it may be used without adjusting its concentration; but if it is of higher strength it is necessary to adjust the concentration to about 20 to 28 percent $P_2O_5$. This may be done by adding water through line 3 and/or recycle liquor through line 26. I prefer to use acid having a concentration equivalent to 23 to 24 percent $P_2O_5$, as I have found that the precipitate formed in the ammoniation vessel under the conditions described below is in such physical state that maximum filterability is obtained with acid of this strength.

Ammonia is introduced via line 4 at a rate less than 15 pounds per cubic foot of slurry in vessel 2 per hour, and preferably 5 to 15 pounds per cubic foot of slurry per hour. Sufficient agitation for good mixing is obtained by merely introducing gaseous ammonia into a lower part of the ammoniation vessel through a spider or other arrangement of piping having suitable openings. More vigorous agitation should be avoided, as it has a deleterious effect upon the separability of the precipitate. Introduction of ammonia at rates greater than 15 pounds per hour per cubic foot of acid also results in the formation of a precipitate that is hard to separate from the solution.

The liquid in the ammoniation vessel is heated to boiling before rapid precipitation. This may be done by slightly preheating the acid introduced into vessel 2 and/or applying a little heat in the vessel itself by any suitable means, such as steam coils 5, a steam jacket, or electric heating elements. In any case the heat of reaction will furnish most of the heat required. When the process is carried out continuously, the heat of reaction furnishes all the heat required.

Ammoniation must be discontinued when the pH of the slurry in the ammoniation vessel is in the range from about 4.5 to 5.5. The ammoniation step may be carried out either batchwise or continuously. When a batch of acid is ammoniated I have found that maximum filterability is obtained when ammoniation is discontinued in the lower part of this range, i.e., about 4.5. When ammoniation is carried out continuously, maximum filterability is obtained in the upper part of the range, i.e., about pH 5.5. I do not know the reason for this variation in filterability with batch and continuous ammoniation at a given pH, but I have found it to occur consistently.

The ammoniated slurry then is passed to a means for separation, illustrated as a rotary filter 7. This transfer of slurry should be accomplished without strong agitation, as I have found that even the agitation caused by passing through a pump adversely affects the filterability of the slurry. For this reason I prefer to accomplish the transfer by gravity flow. A rotary filter equipped with a monofilament filter cloth is my preferred means for separation of precipitate from the solution. When a filter of this type is used, I have found that the filter cake has a tendency to crack very soon after it emerges from the slurry; but this tendency is easily overcome by the use of a drag cloth or smoothing roller. Washing the cake by water sprays 14 is improved by 15 to 20 percent by use of such means for sealing cracks in the filter cake.

The filter cake is withdrawn to a suitable vessel 8, and the combined filtrate and washings are carried away by line 9. This solution in line 9 is an excellent starting material for the production of liquid fertilizers. If desired, a part of this solution can be withdrawn from the system via line 10 to a liquid fertilizer preparation step 11, where it is converted into liquid fertilizer by the addition of suitable salts at 13, and a complete liquid fertilizer is withdrawn to storage or use via line 12.

However, I usually prefer to pass the combined filtrate and washings to a vacuum crystallization step via heater 15 and line 16.

Streams of concentrated filtrate and ammonia are introduced via lines 16 and 21, respectively, into vacuum crystallizer 20. These streams are controlled to maintain the pH of the slurry in crystallizer 20 at about 6.0. The heat necessary may be supplied by any efficient type of heating element, such as the steam coils 22 illustrated. Under these conditions, crystals of diammonium phosphate may be produced at high production rates without much loss of ammonia. I have usually used a pressure of about 4.5 inches of mercury, absolute, which results in a temperature in the crystallizer of about 140° F., and thereby obtained production rates of about 17 to 18 pounds of crystals per hour per cubic foot of material in the crystallizer.

Crystals and accompanying mother liquor are withdrawn from the crystallizer via line 23 and passed to a separation step 24. A centrifuge is the apparatus of choice for removing mother liquor from the crystals. However, both the mother liquor and crystals are impure, since the original precipitation step and filtration do not remove all impurities derived from phosphate rock. As a result, difficulties are encountered in making this separation. I have found that these difficulties may be overcome by recycling a small portion, usually about one-tenth of the mother liquor, to the precipitation step via line 26. It is not necessary to recycle all mother liquor separated from the crystals to the precipitation step, but only enough to cause the crystal separation step to be easily operable. The remainder of the mother liquor is recycled to the vacuum crystallization step by line 27.

Crystalline diammonium phosphate, after separation from mother liquor in separation step 24, is fed to a mixer 28. Here it is mixed with liquefied filter cake introduced through line 29. This liquefied filter cake is obtained by subjecting the cake removed from filter 7 to strong agitation by a high-speed impeller in vessel 8. This cake contains about 20 percent or so of $P_2O_5$ and is a good fertilizer material in itself. It blends well with the diammonium phosphate to form a granular fertilizer. A small amount of ammonia may be added to the liquefied cake if desired. The mixture is then dried and sized and is ready for use.

Alternatively, the diammonium phosphate may be passed on to the drying step without admixture of filter cake, and a product consisting only of fertilizer-grade diammonium phosphate is obtained. In this case the liquefied filter cake is passed via line 31 to an ammoniator 32 and is then dried and granulated in dryer 33. It is then ready for separate use.

EXAMPLE

The process described above was developed through an extensive series of laboratory and pilot-plant tests. Laboratory tests were made in which wet-process phosphoric acid was ammoniated to various pH values, using batch or continuous ammoniation, to determine the effect of degree of ammoniation on the degree of precipitation and on the filtering rate. Batchwise ammoniation tests were made in a beaker in which 3 liters of acid were ammoniated by introducing gaseous ammonia through a glass tube until the desired pH was reached. The continuous ammoniation tests were made in a 3-liter wide-mouthed flask provided with a side outlet tube. Ammonia and wet-process phosphoric acid were introduced separately through two glass tubes located near the bottom of the flask. The slurry left the flask continuously through the side outlet, and the first 9 liters were discarded before making filtering tests to ensure that steady-state conditions had been reached. No mechanical agitation was used in either type of ammoniator. The only agitation was that resulting from natural turbulence. Filtering tests were made in replicate with a test-leaf vacuum filter. The following data were obtained.

*Effect of degree of ammoniation* [1]

| Terminal pH | Degree of precipitation, percent [2] | | | Filtering rate,[3] gal. filtrate/(hr.)(sq.ft.) | |
|---|---|---|---|---|---|
| | $Fe_2O_3$ | $Al_2O_3$ | F | Batch ammoniation | Continuous ammoniation |
| 4.5 | 97.3 | 96.0 | 54.0 | 150 | 115 |
| 5.0 [4] | 97.8 | 96.9 | 54.4 | 135 | 115 |
| 5.5 | 98.1 | 91.6 | 65.5 | 120 | 185 |
| 6.0 | 97.5 | 95.8 | 71.4 | 90 | 170 |

[1] Acid concentration, 24 percent $P_2O_5$; ammoniation rate, about 10 lbs. $NH_3$/(hr.)(cu. ft.); unagitated; boiling.
[2] Data apply to batch ammoniation only.
[3] Filter medium, polyfilament saran; filter vacuum, 15 inches Hg; test leaf; single cycle; replicate tests.
[4] Ten percent of $P_2O_5$ precipitated at pH 5.0.

With batch ammoniation the precipitation of iron and aluminum leveled off at about 97 percent by the time pH 4.5 was reached. In the case of batch ammoniation there was a progressive decrease in filtering rate with increase in pH from 4.5 to 6.0; whereas continuous ammoniation did not follow this trend, but a maximum filtering rate was obtained at pH 5.5.

The effect of acid concentration on the filtering rate of slurries prepared by batch and continuous ammoniation of the acid at a rate of 10 pounds of ammonia per hour per cubic foot of liquor in the vessel was studied. The highest filtering rate was obtained with slurry prepared from acid containing about 23 percent phosphorus pentoxide. Acid concentrations in the range 28 to 30 percent phosphorus pentoxide had a decided detrimental effect on filtering rate, for both batch and continuously ammoniated slurries.

In most of the laboratory and pilot-plant work the thermal conditions were such that the heat of neutralization brought the solution to the boiling point in the course of ammoniation. Little precipitation occurred during the early stages of batch ammoniation, but eventually a point was reached where rapid precipitation occurred. Significant variations in the filtering rates obtained with slurries in which rapid precipitation was controlled to take place at different temperatures are shown in the following table. Decreasing the temperature only slightly below boiling caused a significant decrease in the filtering rate.

mental to the filterability of the precipitate. To obtain a quantitative indication of the effect of agitation, a test was run in which 3 liters of wet-process phosphoric acid containing 24 percent phosphorus pentoxide was ammoniated batchwise to pH 5.0 at a rate of 5 pounds of ammonia per hour per cubic foot. The ammoniation vessel was a glass battery jar 7 inches in diameter. The filtering rate of the resulting slurry, determined on a test-leaf filter, was 160 gallons of filtrate per hour per square foot. A motor-driven propeller was then placed in the slurry and four 1-inch baffles were installed in the jar. After agitation for 30 minutes, the filtering rate had dropped to 28 gallons per hour per square foot. Aging of the slurry for 30 minutes without agitation had no effect on filterability.

As the natural turbulence of ammonia sparging and boiling was adequate for the reaction, mechanical agitation was avoided in the pilot-plant ammoniator. The action of a centrifugal pump also was detrimental to the filterability of the slurry, so gravity flow was used rather than pumping to transfer the slurry from the ammoniator to the pilot-plant filter.

The slurries obtained were filtered on a rotary vacuum filter equipped with a monofilament polyethylene filter cloth. It was found that polyfilament cloths were blinded by the precipitate, but this did not occur with the monofilament cloths. The following table is illustrative of the results obtained.

*Data on precipitation and filtration*

Initial temperature of wet-process acid, °F _____ 150
Size of batch, gal _____ 75
Ammoniation rate, lb. $NH_3$/(hr.)(cu. ft.) _____ 5
Temperature at time of rapid precipitation, °F _____ [1] 220
Terminal pH _____ 5.0
Filtering rate, gal. filtrate/(hr.)(sq. ft. submerged) _____ [2] 100
Wash water rate, lb./lb. slurry _____ 0.18
Ratio of wet filter cake to filtrate, by weight _____ 0.234

Composition of materials, weight percent

|  | $P_2O_5$ | $NH_3$ | $SO_3$ | F | $Fe_2O_3$ | $Al_2O_3$ | CaO | $H_2O$ |
|---|---|---|---|---|---|---|---|---|
| Phosphoric acid | 24.3 |  | 2.58 | 2.06 | 1.23 | 1.29 | 0.26 | 59.4 |
| Slurry to filter | 25.1 | 9.2 | 2.67 | 2.13 | 1.27 | 1.33 | 0.27 | 48.5 |
| Filtrate plus wash | 21.3 | 8.3 | 2.55 | 1.03 | Trace | Trace | Trace | 57.8 |
| Filter cake | [3] 20.0 | 5.3 | 0.88 | 5.00 | 5.58 | 5.58 | 1.17 | 50.0 |

[1] Boiling.
[2] Rotary vacuum filter, 18-inch diameter by 12 inches; monofilament, polyethylene cloth; vacuum, 10 to 14 inches Hg; filtering temperature, 180° F.
[3] About 50 percent of $P_2O_5$ was water soluble.

*Effect of temperature of precipitation* [1]

| Temperature of precipitation, °F. | Ammoniation rate, lb. $NH_3$/(hr.)(cu. ft.) | Filtering rate,[2] gal. filtrate/(hr.)(sq. ft.) |
|---|---|---|
| 220 [3] | 10 | 175 |
| 215 | 10 | 116 |
| 170 | 10 | 19 |
| 220 [3] | 5 | 226 |
| 170 | 5 | 31 |

[1] Acid concentration, 23 per cent $P_2O_5$; batch ammoniation; unagitated; terminal pH, 5.
[2] Filter medium, polyfilament saran; filter vacuum, 15 inches Hg; test leaf; single cycle.
[3] Boiling.

The effect of rate of ammoniation on the filterability of the slurry produced in the precipitation step was studied extensively in batch ammoniation experiments and, less extensively, in continuous ammoniation. The correlation between batch and continuous ammoniation results were good. In general it was found that the filterability of the slurry decreased slowly with increase in rate of ammoniation over the entire range from 5 to 15 pounds of ammonia per hour per cubic foot of acid; but practical filtration rates were obtained at all rates under 15 pounds of ammonia per hour per cubic foot of acid.

In the course of the experimental work on precipitation it became evident that vigorous agitation was detri- The pilot-plant crystallizer was a cylindrical cone-bottomed vessel 18 inches in diameter and 6 feet in overall height. Vapor was withdrawn from a top-entering duct and vacuum was maintained with a two-stage steam ejector. About one-tenth of the total volume of mother liquor from the crystal-separation step was recycled to the precipitation step. The following data were obtained in one of the many runs in this equipment and are typical of those to be expected under the conditions given.

*Pilot-plant data on crystallizer operation*

Temperature, °F _____ 140
pH of slurry _____ 6.0
Crystals in suspension, volume percent _____ 35–40
Crystallization rate, lb./hr.)(cu. ft. mother liquor) _____ 17–18
Loss of $NH_3$ in vapors, percent of input _____ 2.6

Composition of materials, weight percent

|  | $P_2O_5$ | $NH_3$ | $SO_3$ | F | $Fe_2O_3$ | $Al_2O_3$ | $H_2O$ |
|---|---|---|---|---|---|---|---|
| Feed liquor [1] | 27.1 | 10.5 | 3.2 | 1.3 | Trace | Trace | 46.5 |
| Mother liquor | 22.3 | 13.6 | 10.7 | 2.5 | 0.11 | 0.15 | 40.0 |
| Crystals | 46.1 | 24.0 | 5.6 | 2.3 | Trace | Trace | 3.3 |

[1] Filtrate plus wash preconcentrated by atmospheric evaporation.

Crystals were withdrawn and centrifuged to free them from mother liquor. Satisfactory precipitation and filtration were maintained when the variables discussed in the foregoing were held within the recommended ranges.

We claim as our invention:

1. In a process for the production of fertilizer from wet-process phosphoric acid and ammonia, that improvement which comprises adjusting the concentration of wet-process phosphoric acid to the range from about 20 to 28 percent $P_2O_5$; introducing ammonia into the acid at a rate below 15 pounds of ammonia per hour per cubic foot of acid solution; raising the temperature of the acid solution to its boiling point before rapid precipitation occurs; discontinuing introduction of ammonia when the pH of the resulting suspension is in the range from about 4.5 to 5.5; and separating the resulting easily separable precipitate from the solution without strong agitation.

2. In a process for the production of fertilizer from wet-process phosphoric acid and ammonia, that improvement which comprises introducing ammonia into wet-process phosphoric acid having a concentration equivalent to about 20 to 28 percent $P_2O_5$; controlling the rate at which ammonia is introduced at a rate below 15 pounds of ammonia per hour per cubic foot of acid solution; raising the temperature of the acid solution to its boiling point before rapid precipitation occurs; discontinuing introduction of ammonia when the pH of the resulting suspension is in the range from about 4.5 to 5.5; and separating the resulting easily separable precipitate from the resulting solution without strong agitation.

3. In a process for the production of fertilizer from wet-process phosphoric acid and ammonia, that improvement which comprises introducing ammonia into wet-process phosphoric acid having a concentration equivalent to about 23 to 24 percent $P_2O_5$; controlling the rate at which ammonia is introduced in the range from 5 to 15 pounds of ammonia per hour per cubic foot of acid solution; raising the temperature of the acid solution to its boiling point before rapid precipitation occurs; discontinuing introduction of ammonia when the pH of the resulting suspension is in the range from about 4.5 to 5.5; and separating the resulting easily separable precipitate from the resulting solution without strong agitation.

4. In a process for the production of fertilizer from wet-process phosphoric acid and ammonia, that improvement which comprises introducing ammonia into wet-process phosphoric acid having a concentration equivalent to about 20 to 28 percent $P_2O_5$; controlling the rate at which ammonia is introduced in the range from 5 to 15 pounds of ammonia per hour per cubic foot of acid solution; raising the temperature of the acid solution to its boiling point before rapid precipitation occurs; discontinuing introduction of ammonia when the pH of the resulting suspension is in the range from about 4.5 to 5.5; separating the resulting easily separable precipitate from the resulting solution; ammoniating this solution to about pH 6.0 at boiling temperature under vacuum, thereby crystallizing diammonium phosphate from the solution; withdrawing resulting impure crystals of diammonium phosphate with accompanying mother liquor; separating the crystals from mother liquor; recycling mother liquor to the above precipitation and crystallization steps; and drying the diammonium phosphate crystals.

5. In a process for the production of fertilizer from wet-process phosphoric acid and ammonia, that improvement which comprises introducing ammonia into wet-process phosphoric acid having a concentration equivalent to about 20 to 28 percent $P_2O_5$; controlling the rate at which ammonia is introduced in the range from 5 to 15 pounds of ammonia per hour per cubic foot of acid solution; raising the temperature of the acid solution to its boiling point before rapid precipitation occurs; discontinuing introduction of ammonia when the pH of the resulting suspensions is in the range from about 4.5 to 5.5; separating the resulting easily separable precipitate from the resulting solution; ammoniating this solution to about pH 6.0 at boiling temperature under vacuum, thereby crystallizing diammonium phosphate from the solution; withdrawing resulting impure crystals of diammonium phosphate with accompanying mother liquor; separating the crystals from mother liquor; recycling mother liquor to the above precipitation and crystallization steps; liquefying the precipitate separated from the solution; mixing the liquefied precipitate with the impure diammonium phosphate crystals; and drying the resulting mixture.

6. In a process for the production of fertilizer from wet-process phosphoric acid and ammonia, that improvement which comprises introducing ammonia into wet-process phosphoric acid having a concentration equivalent to about 20 to 28 percent $P_2O_5$; controlling the rate at which ammonia is introduced in the range from 5 to 15 pounds of ammonia per hour per cubic foot of acid solution; raising the temperature of the acid solution to its boiling point before rapid precipitation occurs; discontinuing introduction of ammonia when the pH of the resulting suspension is in the range from about 4.5 to 5.5; separating the resulting easily separable precipitate from the resulting solution; ammoniating this solution to about pH 6.0 at boiling temperature under vacuum, thereby crystallizing diammonium phosphate from the solution; withdrawing resulting impure crystals of diammonium phosphate with accompanying mother liquor; separating the crystals from mother liquor; recycling mother liquor to the above precipitation and crystallization steps; liquefying the precipitate separated from the solution; ammoniating the liquefied precipitate; and granulating and drying the resulting mixture.

7. In a process for the production of fertilizer from wet-process phosphoric acid and ammonia, that improvement which comprises introducing ammonia into a batch of wet-process phosphoric acid having a concentration equivalent to about 20 to 28 percent $P_2O_5$; controlling the rate at which ammonia is introduced in the range from 5 to 15 pounds of ammonia per hour per cubic foot of acid solution; raising the temperature of the acid solution to its boiling point before rapid precipitation occurs; discontinuing introduction of ammonia when the pH of the resulting suspension is about 4.5; and separating the resulting easily separable precipitate from the resulting solution without strong agitation.

8. In a process for the production of fertilizer from wet-process phosphoric acid and ammonia, that improvement which comprises continuously introducing separate streams of ammonia and phosphoric acid having a concentration of about 20 to 28 percent $P_2O_5$ into a precipitation zone; therein maintaining the resulting suspension at boiling temperature; controlling the rates at which acid and ammonia are introduced so that from 5 to 15 pounds of ammonia per cubic foot of acid solution in the precipitation zone per hour are introduced and the resulting solution overflows from the precipitation zone at a pH of about 5.5; and filtering the resulting easily filterable precipitate from the resulting solution.

9. In a process for the production of fertilizer from wet-process phosphoric acid and ammonia, that improvement which comprises continuously introducing separate streams of ammonia and phosphoric acid having a concentration of about 20 to 28 percent $P_2O_5$ into a precipitation zone; therein maintaining the resulting suspension at boiling temperature; controlling the rates at which acid and ammonia are introduced so that from 5 to 15 pounds of ammonia per cubic foot of acid solution in the precipitation zone per hour are introduced and the resulting solution overflows from the precipitation zone at a pH of about 5.5; filtering the resulting easily filterable precipitate from the resulting solution; ammoniating this solution to about pH 6.0 at boiling temperature under vacuum, thereby crystallizing diammonium phosphate from the solution; withdrawing resulting impure crystals with accompanying mother liquor; separating the crystals from the mother liquor; and recycling about one-tenth of the mother liquor to the above precipitation step.

(References on following page)

References Cited in the file of this patent

UNITED STATES PATENTS

| | | |
|---|---|---|
| 1,822,040 | Klugh et al. | Sept. 8, 1931 |
| 2,033,388 | Moose | Mar. 10, 1936 |
| 2,792,286 | Wordie et al. | May 14, 1957 |

OTHER REFERENCES

Chemical Engineering, New Job for Wet-Process Phosphoric Acid, vol. 62, No. 11, November 1955, pp. 118 and 120.